United States Patent [19]

Inui et al.

[11] 4,415,904

[45] Nov. 15, 1983

[54] THERMAL HEAD DRIVING METHOD

[75] Inventors: Toshiharu Inui; Haruhiko Moriguchi, both of Kanagawa, Japan

[73] Assignee: Fuji Xerox Co., Ltd., Kanagawa, Japan

[21] Appl. No.: 372,353

[22] Filed: Apr. 27, 1982

[30] Foreign Application Priority Data

Apr. 30, 1981 [JP] Japan ............................... 56/65488

[51] Int. Cl.$^3$ ........................ G01D 9/00; G01D 15/10

[52] U.S. Cl. ................................ 346/1.1; 346/76 PH

[58] Field of Search .................. 219/216; 346/76 PH, 346/1.1; 400/120

[56] References Cited

U.S. PATENT DOCUMENTS 4,219,824 8/1980 Asai .................................. 219/216

4,262,188 4/1981 Beach ................................ 219/216

4,271,414 6/1981 Williams et al. .................... 219/216

4,284,876 8/1981 Ishibushi et al. .................... 219/216

4,305,080 11/1981 Cunningham et al. ............ 219/216

*Primary Examiner*—Elliot A. Goldberg

*Assistant Examiner*—T. DeBoer

*Attorney, Agent, or Firm*—Sughrue, Mion, Zinn, Seas & Macpeak

[57] ABSTRACT

A method of driving a thermal printing head includes expanding the printing time for a line which follows successive non-printed (blank) lines. In this manner, deterioration otherwise caused in the print density can be avoided without employing an auxiliary heater for the thermal head. Instead of expanding the printing time, the applied voltage may be increased to achieve the same result.

7 Claims, 8 Drawing Figures

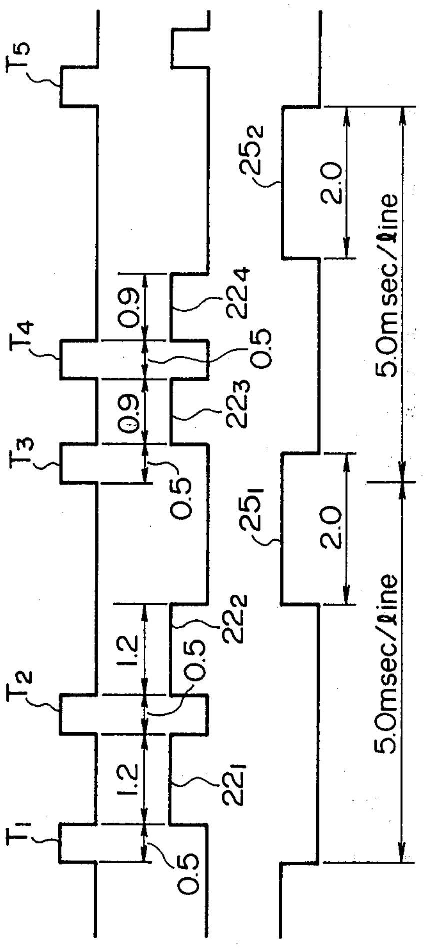
FIG. 4(a)
FIG. 4(b)
FIG. 4(c)
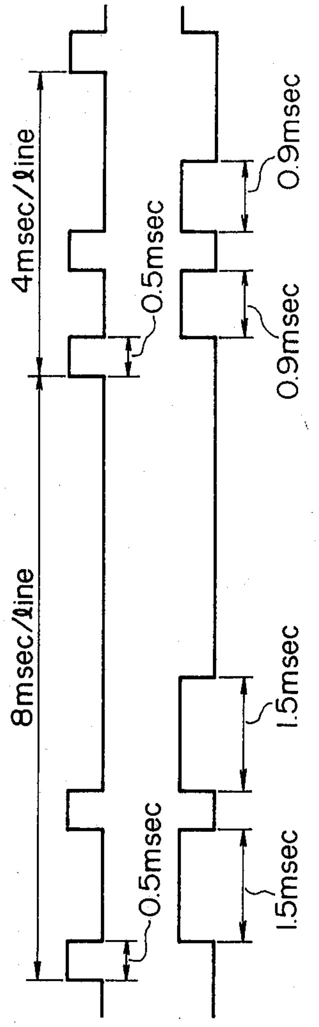
FIG. 5(a)
FIG. 5(b)

THERMAL HEAD DRIVING METHOD

BACKGROUND OF THE INVENTION

This invention relates to a method of driving a thermal head employed in a heat-sensitive recording device.

In a heat-sensitive recording device using a thermal head, the thermal head is driven according to a given image signal, so that the heat-generating elements arranged on the substrate thereof are selectively heated. The image data are recorded on a recording sheet which is set in contact with the heat-generating elements.

In a heat-sensitive recording device used in a printer, for instance, the thermal head is driven only for lines in which printing is to be carried out (hereinafter referred to as "printing lines"); that is, it is not driven for inter-lines and lines in which printing is not carried out (hereinafter referred to as "non-printing lines"). Therefore, in the case of a heat-sensitive recording device in which recording is carried out for each line perpendicular to the direction of the arrow 2 in FIG. 1 (i.e., the auxiliary scan direction) in which the recording sheet is being moved, the larger part of the heat from the heat-generating elements flows to the substrate side. Accordingly, the amount of heat supplied to the recording sheet is decreased in recording the first several lines of the series of printing lines $3A_1$, $3A_2$, . . . (as shaded in FIG. 1). This tendency is especially significant for the printing lines $3A_2$, . . . which are located after non-printing lines $3B_1$, $3B_2$, . . . , so that the print density is decreased for the first several printing lines of this sort. The same difficulty occurs with a facsimile device using white line skip system in which scanning lines in which recording is not carried out are skipped at high speed.

SUMMARY OF THE INVENTION

In view of the foregiong, an object of this invention is to provide a method of driving a thermal head in which, even where a non-printing line or lines occur, the recording density is not decreased for the printing line following the non-printing line or lines.

In the invention, the time $t_1$ used for recording the first printing line $4_1$, coming immediately after "white" data where no printing is required is set longer than that, $t_2$, of printing lines $4_2$, $4_3$, . . . in succession with the printing line $4_1$, or, alternatively the voltage applied to the heat-generating elements is changed while the recording time is maintained unchanged, so that the amount of energy supplied to the heat-generating elements is increased in recording the first printing line or several printing lines in succession therewith, to thereby achieve the aforementioned object.

BRIEF DESCRIPTION OF THE DRAWINGS

FIGS. 4(*a*)–4(*c*) are timing charts for describing a method of driving the thermal head in the recording device of FIG. 3; and FIGS. 5(*a*) and 5(*b*) are timing charts for describing a method of driving the thermal head according to one modification of the invention.

DETAILED DESCRIPTION OF THE PREFERRED EMBODIMENTS

Figure 1:
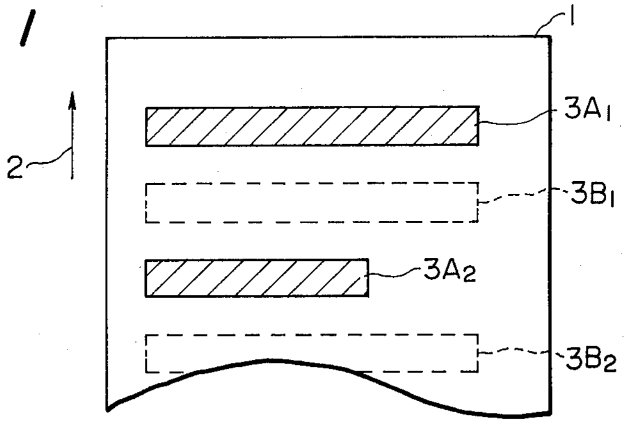
FIG. 1 is an explanatory diagram for describing the reason behind the loss of printing density in a printer of the thermal type.
Figure 2:
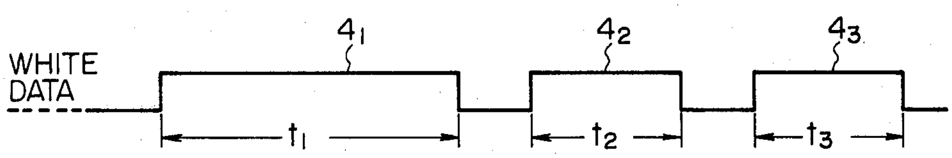
FIG. 2 is a timing chart for describing the principle of this invention.
Figure 3:
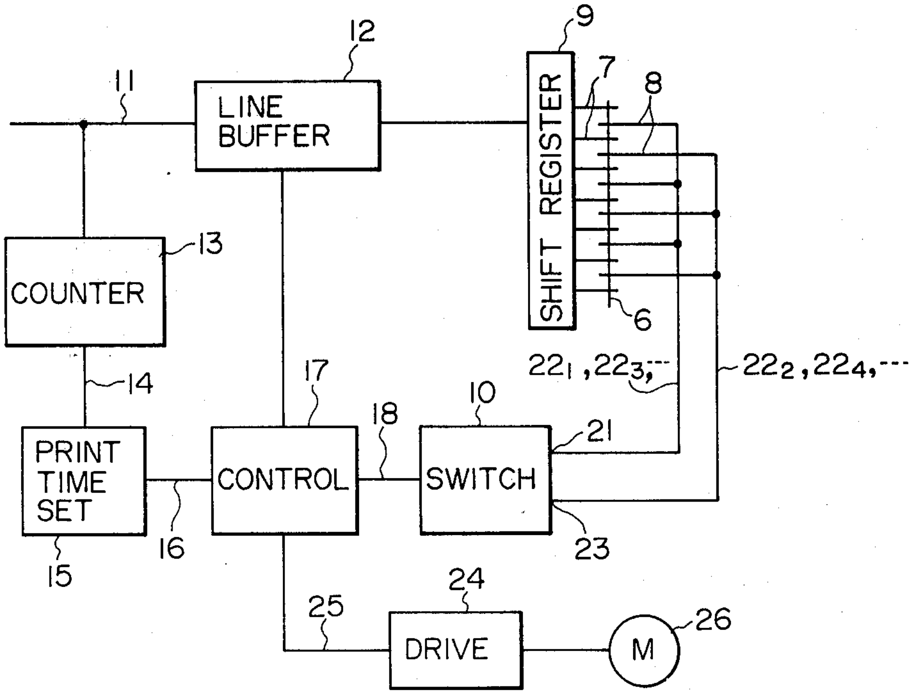
FIG. 3 is a block diagram of a heat-sensitive recording device according to one embodiment of this invention.

FIG. 3 shows the essential components of a heat-sensitive recording device having a thermal head in which the heat-sensitive elements are driven in a staggered manner. In the thermal head of the device, the first ends of different lead wires 7 and 8 are alternately connected to a heat generating body 6 at predetermined intervals. The remaining ends of the lead wires 7 are connected to the parallel signal output terminals of a shift register 9. The remaining ends of the lead wires 8 are connected to a switch circuit 10.

An image signal 11 for every line supplied to the device is stored in a line buffer 12, and is simultaneously applied to a counter circuit 13. The counter circuit 13 counts the number of picture or "black" image signals which exist in the image signal of one line. When the counter circuit 13 has counted the number of "black" image signals for the line, the counter circuit 13 outputs a print state signal 14 indicating whether or not the count value is zero.

The print state signal 14, being provided for every line, is supplied to a print time setting circuit 15. The print time setting circuit 15 includes a memory for storing the print state signals for several lines; and a logic element for determining a printing time from the print state signals stored in the memory, so that where a line having a count value of at least one (1) comes after at least two lines which have had a count value of zero (0), the print time setting circuit 15 outputs a print time expansion signal 16 for this first line.

It is assumed that, after image signals including no print data have continued for several lines, the image signal 11 including print data is supplied to the line buffer 12 and the counter circuit 13. Then, after all of the image signal for one line has been supplied to the line buffer 12, half of the image signal is supplied to the shift register 9 in a first data set period $T_1$ (as shown in FIG. 4(*a*)), where it is set. The data set period $T_1$ is set to 0.5 msec, similarly to other data set periods $T_2$, $T_3$ and so on (described later).

Before the data set period $T_1$ is over, the print time setting circuit 15 outputs the aformentioned print time expansion signal 16. Upon reception of the print time expansion signal 16, a control circuit 17 outputs a pulse application signal 18 for 1.2 msec after the data set period $T_1$ has passed. Upon reception of the pulse application signal 18, the switch circuit 10 outputs an application pulse $22_1$ through one output terminal 21 for 1.2 msec as shown in FIG. 4(*b*). The application pulse $22_1$ is applied, for instance, only to the odd-numbered ones of the lead wires 8. Therefore, the heat generating body 6 is selectively heated for 1.2 msec according to the image signal currently applied to the lead wires 7.

Immediately after this half of the image signal for one line has been recorded as described above, the second data set period $T_2$ (FIG. 4(*a*)) starts and the remaining image signal is supplied to the shift register 9. Similarly, the control circuit 17 outputs the pulse application signal 18 for 1.2 msec immediately after the data set period $T_2$ has passed. Upon reception of this second pulse application signal 18, the switch circuit 10 outputs an application pulse $22_2$ (FIG. 4(*b*)) from its other output terminal 23 for 1.2 msec. The application pulse is applied, for instance, only to the even-numbered ones of the lead wires 8. Thus, the remaining image signal for one line is recorded for 1.2 msec.

When the recording of one line has been accomplished, the control circuit 17 supplies an auxiliary scan control signal $25_1$ to a motor drive circuit 24 for 2 msec, whereby a step-motor 26 is driven by the drive circuit 24 for 2 msec to advance the recording sheet by as much as one line.

In the above-described heat-sensitive recording device, the time interval which elapses from the instant when the setting of the data of a line in the shift register starts until the setting of the data of the next line therein starts is set to 5 msec, as is apparent from FIG. 4. Therefore, the data set period $T_3$ for the next line is partially overlapped with the time of movement of the recording sheet; however, recording will never be adversely affected because the movement of the recording sheet is stopped before the data set period $T_3$ has passed.

Let us consider the case where an image signal including print data is supplied for this line also. In this case, the counter circuit 13 outputs the print state signal 14 representative of the fact that the number of "black" image signals is at least one (1). Upon reception of the signal 14, the print time setting circuit 15 determines therefrom the continuity of lines having a count value of at least one, to thereby suspend the provision of the print time expansion signal 16. It goes without saying that, depending on various conditions such as for instance the structure of the thermal head to be used, the print time expansion signal 16 may be ouputted not only for the first (one) line but also for more than one line when lines including print data continue.

When the print time expansion signal 16 is not supplied to the control circuit 17, the latter carries out ordinary print time setting. More specifically, when each of the data set periods $T_3$ and $T_4$ has passed, the control circuit 17 produces the pulse application signal 18 for 0.9 msec. In response to the signal 18, the switch circuit 10 outputs an application pulse $22_3$ through its output terminal 21 for 0.9 msec. After the next data is loaded in the shift register 9, the switch circuit 10 outputs an application pulse $22_4$ through its output terminal 23 for 0.9 msec. In this case, the control circuit 17 supplies an auxiliary scan control signal $25_2$ to the motor drive circuit 24 0.2 msec after application pulse $22_4$ falls. After the auxiliary scan control signal $25_2$ has been outputted for 2 msec, the next line's first data setting operation is started. The above-described operation is repeatedly carried out.

FIG. 5 shows one modification of the invention. In the modification also, in order that heat-generating elements arranged in a staggered manner are caused to alternately generate heat, the time of application of the signal to the thermal head is set to 1.5 msec for a printing line after a plurality of lines including no print data continue, as shown in FIG. 5(*a*). If the time width of the application pulse is expanded to 1.5 msec under the conditions indicated in the above-described embodiment, then printing is carried out during the movement of the recording sheet; that is, the print result is not satisfactory with the thermal head in which the heat-generating elements are driven in a staggered manner. Therefore, in the modification, the corresponding line recording speed is decreased to 8 msec/line from 4 msec/line for instance, so that there is sufficient time to supply the application pulse. According to the modification, the recording time is not particularly delayed, as a whole.

As is apparent from the above description, according to the invention, the print density is made uniform by directly increasing the amount of energy to be supplied to the thermal head. Therefore, the invention is advantageous in that it is unnecessary to provide an auxiliary heating means for the thermal head and the mechanism is simplified by as much.

In the above-described embodiments, the time of application of the pulse applied to the thermal head is changed; however, it goes without saying that the same effect may be obtained by changing the applied voltage. While the invention has been described with reference to a thermal head in which the heat-generating elements are driven in staggered manner, it should be noted that the invention is not limited thereto or thereby.

What is claimed is:

1. In a method of driving a thermal head of a heat-sensitive recording device by applying driving energy at a first of two discrete energy levels, said thermal head being utilized to perform heat-sensitive recording of picture signals in a printing line onto a recording sheet which is in contact with said thermal head, the improvement comprising; detecting an occurrence of one or more non-print lines wherein no printing is to be carried out, and increasing said driving energy supplied to said thermal head from said first level to a second level for a plurality of printing lines to be printed immediately following said one or more non-print printing lines.

2. A method as claimed in claim 1, wherein said energy is increased by expanding the printing time of said plurality of printing lines to be printed immediately following said non-print printing line or lines.

3. A method as claimed in claim 1, wherein said energy is increased by increasing a voltage applied to said thermal head for printing said plurality of printing lines to be printed immediately following said non-print printing line or lines.

4. A method as claimed in claim 1, wherein said non-print printing lines are detected by counting the number of picture signals present in a printing line and wherein the results of said counting are applied, in the form of a print state signal of either a first value if one or more picture signals are counted in a printing line or a second value if no picture signals are counted in a printing line, to a processing means including a memory for storing said print state signals for several printing lines and a logic element for determining said level of said driving energy at a function of said stored print state signals.

5. A method as claimed in claim 1, including decreasing said energy supplied to said printing head after printing of said single or plural lines.

6. A method as claimed in claim 4, including setting said data for a line during a portion of a time period when a drive pulse is applied to a motor for advancing said sheet.

7. A method as claimed in claim 1, wherein said energy supplied to said thermal head is increased from said first level to said second level for a single printed printing line immediately following said non-print printing line or lines.

* * * * *